United States Patent [19]
Popoff et al.

[11] Patent Number: 5,770,065
[45] Date of Patent: Jun. 23, 1998

[54] FUEL FILTER ASSEMBLY WITH REPLACEMENT ELEMENT

[75] Inventors: Peter Popoff; David H. Hodgkins, both of Modesto; Michael D. Clausen, Turlock; Victor R. Oelschlaegel, Modesto, all of Calif.

[73] Assignee: Parker Hannifin Corporation, Cleveland, Ohio

[21] Appl. No.: 731,114

[22] Filed: Oct. 9, 1996

Related U.S. Application Data

[63] Continuation of Ser. No. 441,584, May 15, 1995, abandoned, which is a continuation of Ser. No. 121,803, Sep. 15, 1993, abandoned.

[51] Int. Cl.⁶ .................................................. B01D 35/02
[52] U.S. Cl. ......................... 210/232; 210/234; 210/430; 210/438; 210/450; 210/454; 210/493.2
[58] Field of Search ................................... 210/234, 235, 210/245, 248, 341, 419, 430, 438, 454, 457, 493.2, 497.01, 130, 429, 450, 232

[56] References Cited

U.S. PATENT DOCUMENTS

| | | |
|---|---|---|
| 1,407,763 | 2/1922 | Langston . |
| 1,468,906 | 9/1923 | Inman . |
| 1,746,336 | 2/1930 | Breer . |
| 2,071,529 | 2/1937 | Howard . |
| 2,431,782 | 12/1947 | Walton et al. . |
| 2,544,244 | 3/1951 | Vokes . |
| 2,858,026 | 10/1958 | Lorimer . |
| 3,040,894 | 6/1962 | Pall . |
| 3,056,503 | 10/1962 | Roosa . |
| 3,105,042 | 9/1963 | Roosa . |
| 3,151,071 | 9/1964 | Kasten ..................................... 210/352 |
| 3,216,571 | 11/1965 | Whiting et al. .......................... 210/456 |
| 3,232,437 | 2/1966 | Hultgren . |
| 3,363,762 | 1/1968 | Ensign . |
| 3,388,801 | 6/1968 | Boyd et al. . |
| 3,473,664 | 10/1969 | Hultgren . |
| 3,487,932 | 1/1970 | Forrester et al. ........................ 210/130 |
| 3,529,727 | 9/1970 | Bernhard . |
| 3,589,517 | 6/1971 | Palmai . |
| 3,608,726 | 9/1971 | Crowther . |
| 3,931,011 | 1/1976 | Richards et al. . |
| 4,035,306 | 7/1977 | Maddocks . |
| 4,052,307 | 10/1977 | Humbert, Jr. . |

(List continued on next page.)

FOREIGN PATENT DOCUMENTS

| | | |
|---|---|---|
| 570727 | 9/1958 | Belgium . |
| 0 079 841 | 5/1983 | European Pat. Off. . |
| 0 164 548 | 12/1985 | European Pat. Off. . |
| 0 260 069 | 3/1988 | European Pat. Off. . |
| 0 289 188 | 11/1988 | European Pat. Off. . |
| 0426064 | 5/1991 | European Pat. Off. . |
| 0483119 | 4/1992 | European Pat. Off. . |
| 0532161 | 3/1993 | European Pat. Off. . |
| 686520 | 7/1930 | France ................................... 210/234 |
| 1909130 | 2/1969 | Germany . |
| 1915923 | 10/1970 | Germany . |
| 3249144 | 3/1986 | Germany . |
| 333469 | 12/1935 | Italy . |
| 1 075 424 | 7/1967 | United Kingdom . |

*Primary Examiner*—Matthew O. Savage
*Attorney, Agent, or Firm*—Renner, Otto, Boisselle & Sklar, P.L.L.

[57] ABSTRACT

A fuel filter assembly includes a housing (12) with a removable element (24) mounted therein. The housing has an inlet port (14) in direct fluid communication with a chamber (18). The outlet port (16) is in direct fluid communication with a central standpipe (22). The standpipe has a flow element (42) movable therein for controlling the condition of flow openings (36) in the standpipe. The element includes projections (88) for engaging recesses (90) in a cover (28) to selectively latch the element and cover together. The cover further includes a cover projection (82) for supporting a projection (78) on end cap (60) of the filter element, which opens flow into the standpipe only when the element is installed. When the element is removed, the flow element prevents the introduction of contaminants into the standpipe.

55 Claims, 7 Drawing Sheets

U.S. PATENT DOCUMENTS

| | | |
|---|---|---|
| 4,091,263 | 5/1978 | Richards et al. . |
| 4,094,791 | 6/1978 | Conrad . |
| 4,139,468 | 2/1979 | Rosaen . |
| 4,237,015 | 12/1980 | Fearnhead . |
| 4,437,986 | 3/1984 | Hutchins et al. . |
| 4,508,621 | 4/1985 | Jackson . |
| 4,522,712 | 6/1985 | Fischer et al. . |
| 4,619,764 | 10/1986 | Church et al. . |
| 4,668,393 | 5/1987 | Stone . |
| 4,692,245 | 9/1987 | Church et al. . |
| 4,732,671 | 3/1988 | Thornton et al. . |
| 4,836,923 | 6/1989 | Popoff et al. . |
| 4,906,365 | 3/1990 | Baumann et al. . |
| 4,976,852 | 12/1990 | Janik et al. . |
| 4,997,555 | 3/1991 | Church et al. . |
| 5,017,285 | 5/1991 | Janik et al. . |
| 5,020,610 | 6/1991 | Lyon et al. . |
| 5,030,345 | 7/1991 | Thomas . |
| 5,049,269 | 9/1991 | Shah . |
| 5,084,170 | 1/1992 | Janik et al. . |
| 5,098,559 | 3/1992 | Mack et al. ............................ 210/130 |
| 5,244,571 | 9/1993 | Church et al. . |
| 5,300,223 | 4/1994 | Wright .................... 210/232 |
| 5,312,546 | 5/1994 | Janik ...................... 210/438 |
| 5,362,390 | 11/1994 | Widenhoefer et al. . |

FUEL FILTER ASSEMBLY WITH REPLACEMENT ELEMENT

This application is a continuation of U.S. patent application Ser. No. 08/441,584, filed on May 15, 1995, now abandoned, which was a continuation of U.S. patent application Ser. No. 08/121,803, filed on Sep. 15, 1993, also now abandoned.

TECHNICAL FIELD

This invention relates to fluid filters. Specifically this invention relates to a fuel filter assembly with a replaceable element for filtering fuel, such as diesel fuel, that is used to power a self-propelled vehicle.

BACKGROUND ART

Many types of fuel filters are known in the prior art. A popular type of fuel filter construction is one that has a housing which encloses a replaceable filter element. Fuel used to power a self-propelled vehicle, such as gasoline or diesel fuel, is cleansed of impurities as it passes through filter media of the filter element. The filter media captures many of the impurities that are removed from the fuel. Other impurities collect on the surface of the media and fall downward into a bottom area of the filter housing from which they may be periodically removed through a drain valve.

Periodically the filter element must be replaced. Such periodic replacement ensures that the filter element will not become so loaded with impurities that fuel flow is restricted. Replacing the element also ensures that impurities are removed from fuel before it is delivered to other fuel system components such as fuel injection pumps and fuel injectors, where such contaminants may cause severe damage.

Changing filter elements may pose problems however. One common problem is that disturbance of the spent element during replacement may cause collected impurities to fall off the element. In some designs, these impurities may travel into the outlet of the filter housing. As a result these contaminants may reach the components downstream in the fuel system.

Another problem with certain prior art fuel filter constructions is that changing the element may require a mechanic to have skin contact with the fuel. It is desirable to minimize such contact when changing a filter element.

To reduce these problems, the filter assembly element shown in U.S. Pat. No. 4,836,923, owned by the Assignee of the present invention, was developed. This filter assembly includes a replaceable filter element that is attached to a removable cover. This construction enables changing the element while avoiding skin contact with fuel.

A further advantage of this prior art design is that it has an internal standpipe with an opening at the top. When the element is removed from the housing, the fuel level in the housing falls below the opening to the standpipe. As a result, the impurity-laden fuel left in the housing is less likely to reach the outlet. Likewise when a new element is installed in the housing, only fuel that has been purified by passing through the media of the element is enabled to reach the opening and pass out of the assembly.

While this prior design has many advantages, it has some shortcomings. First, if the filter element is not removed carefully, impurity-laden fuel in the housing or from the outer surface of the element may fall into the opening in the standpipe. If this happens, some impurities may reach the downstream components of the fuel system.

A further shortcoming of the prior art design is that the cover is discarded with each spent element. This is undesirable from a conservation and solid waste standpoint. It is generally desirable to minimize the amount of material discarded, particularly if a discarded element must be treated as hazardous waste. The cover also represents a portion of the cost of the replacement element. As a result this design adds cost to the replacement element.

Sometimes individuals who do not care about maintaining the vehicle on which the prior art filter assembly is used, may separate the element from the attached cover portion and install the cover on the housing without the element. This causes the vehicle to operate without fuel filtration until the problem is discovered. If the vehicle is operated for an extended period of time in this condition, damage to fuel system components may occur.

Thus there exists a need for fuel filter assembly with a replaceable element that has increased reliability, reduces waste, is lower in cost, and minimizes the risk of skin contact during element changes.

DISCLOSURE OF INVENTION

It is an object of the present invention to provide a fuel filter, assembly with a replaceable element that reliably prevents impurities from passing out of the assembly.

It is a further object of the present invention to provide a fuel filter assembly with a replaceable element that requires less material to be discarded when an element is replaced.

It is a further object of the present invention to provide a fuel filter assembly with a replaceable element that is lower in cost.

It is a further object of the present invention to provide a fuel filter assembly with a replaceable element that minimizes the risk of skin contact during an element change.

It is a further object of the present invention to provide a fuel filter assembly with a replaceable element that is adapted for use with elements that use either an outside-in or inside-out flow.

Further objects of the present invention will be made apparent in the following Best Mode For Carrying Out Invention and the appended claims.

The foregoing objects are accomplished in the preferred embodiment of the invention by a fuel filter assembly including a housing. The housing encloses a cylindrical internal chamber which has an opening at the top. The housing also has an inlet port and an outlet port. The outlet port is connected to a standpipe which extends vertically upward inside the chamber.

The chamber is adapted for receiving a replaceable element. The element includes a ring of media material for removing impurities from fuel that passes therethrough. The media extends in surrounding relation of the standpipe. The element has a lower end-cap which includes a central opening for accepting the standpipe. A seal extends between the surface of the standpipe and the opening in the lower end cap to assure that fuel may only reach an area adjacent to the standpipe by passing through the media.

The element also has an upper end cap. The upper end cap includes latching means for selectively latching the end cap and the element to a cover. The cover is sized for closing the opening at the top of the housing.

The upper end cap also includes a first projection that extends into the interior area of the element. A recess overlies the projection on the end cap. A cover projection that extends from the cover is accepted into the recess on the upper end cap when the cover and the element are latched together.

The standpipe includes a movable flow element mounted therein. The flow element is biased outwardly by a spring toward a position wherein radially extending openings through a side wall of the standpipe are blocked by the flow control element. The flow element is accessible through an actuator opening in the top of the standpipe.

When the latched element and cover assembly is installed in the housing, the projections on the upper end cap engage and move the flow element to open flow through the openings in the standpipe. As a result, fuel may flow through the assembly. If the element is partially removed, the projection enables the flow element to close the openings. As a result, whenever the element is removed, such as during an element change, contaminated fuel cannot pass through the openings. In addition, because the openings in the standpipe extend radially, impurities are less likely to collect in them during an element change.

Once the element is removed from the housing, it may be readily unlatched from the cover, and a fresh element latched in position. Skin contact with fuel is minimized. Because the cover is reused, the amount of discarded waste material is reduced.

When the fresh element is installed in the chamber, the end cap and cover engage the flow element so that it is again moved to the open position, so that the filter will operate. The cover projection is sized to prevent flow through the assembly if it is attempted to operate the unit without an element in latched relation with the cover.

BEST MODE FOR CARRYING OUT INVENTION

Figure 1:
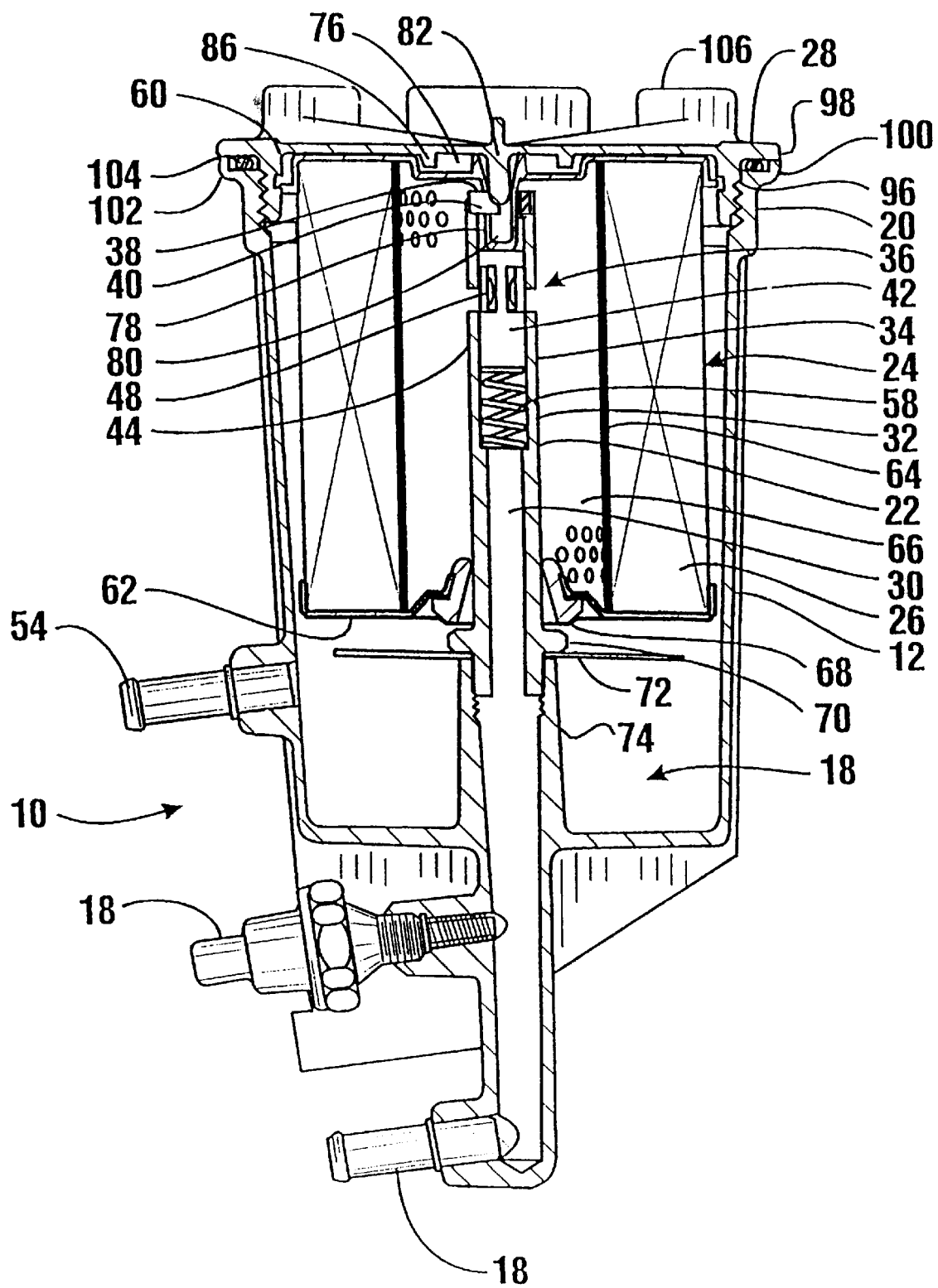
FIG. 1 is a cross-sectional view of the fuel filter assembly with removable element of a first embodiment of the present invention.

Referring now to the drawings and particularly to FIG. 1, there is shown therein a first embodiment of the fuel filter assembly with replaceable element of the present invention, generally indicated 10. The assembly includes a generally cylindrical housing 12. The housing 12 includes an inlet port 14 and an outlet port 16.

Inlet port 14 is in direct fluid communication with a chamber 18 in said housing. Chamber 18 is a generally cylindrical chamber having a circular opening (not separately shown) at its upper end 20. Outlet port 16 is in direct fluid communication with a standpipe 22. Standpipe 22 is generally centered in chamber 18.

A replaceable filter element 24 is removably mounted in chamber 18. Filter element 24 includes a ring of media 26 in generally surrounding relation of standpipe 22. Media 26 may be one of several types of media material adapted for removing impurities from fuel that passes therethrough. In the preferred form of the invention, fuel passes through the media 26 in an outside-in flow pattern. However, in other embodiments of the invention an inside-out flow pattern may be used.

The fuel filter assembly further includes a cover 28 adapted for closing the opening to chamber 18. Cover 28 is further adapted for selectively latching the cover and filter element 24 together as later explained.

The standpipe 22 includes an internal flow passage 30 in fluid communication through the housing with outlet port 16. The standpipe 22 includes a cylindrical wall 32 which has a cylindrical interior surface 34 adjacent its upper end. A pair of radially extending openings 36 extend through wall 32 of the standpipe. The standpipe also includes an actuator opening 38 in its top end. Actuator opening 38 is bounded by a guide ring 40.

Figure 3:
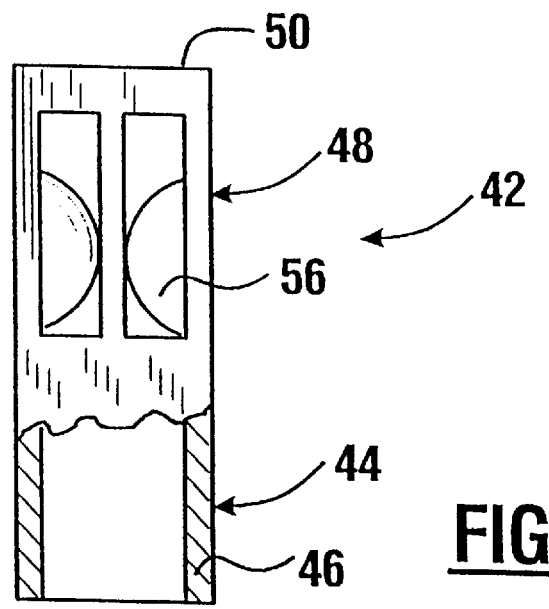
FIG. 3 is a partially sectioned side view of the flow control element.
Figure 4:
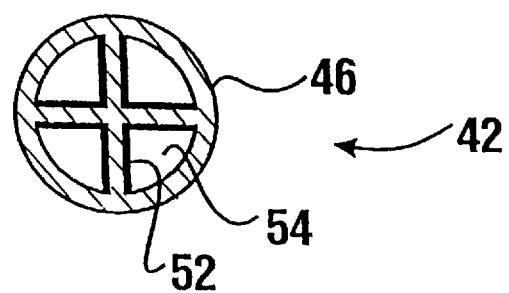
FIG. 4 is a bottom view of the flow control element.

A flow element 42 is mounted for longitudinal movement in standpipe 22. As shown in FIGS. 3 and 4, flow element 42 has a lower cylindrical portion 44 bounded by a cylindrical element wall 46. Element 42 further includes a head portion 48 which has a flat, solid, top portion 50.

Flow element 42 further includes cross members 52 that bound flow cavities 54. Cross members 52 extend through the element to top portion 50. Wall 46 terminates at the head portion, however, and enables fluid access to the flow cavities 54 between the cross members. Cross members 52 also include cut-outs 56 in the head portion to facilitate fluid flow into flow cavities 54.

Flow element 42 is sized so that cylindrical wall 46 and top portion 50 are in close-fitting, movable relation with interior surface 34 of standpipe 22. The flow element 42 is thereby made longitudinally movable inside the standpipe. A spring 58 mounted in standpipe 22 serves as biasing means for biasing the flow element in the outward direction toward actuator opening 38. Guide ring 40 serves to prevent flow element 42 from passing out of the standpipe through the actuator opening.

Flow element 42, the standpipe, and the openings therein, operate together as valve means to control fluid communication between the chamber inside the housing and the interior of the standpipe. When head portion 48 of the flow element is adjacent openings 36 of the standpipe as shown in FIG. 1, the flow passages 36, which enable fluid to be admitted to the standpipe, are open. Fuel flows into the standpipe and passes through flow cavities 54 in the flow element, and eventually passes to the outlet port 16 of the assembly. However, when the flow element 42 is disposed upward from the position shown in FIG. 1, the cylindrical portion of the flow element is disposed with its cylindrical element wall adjacent and in blocking relation to openings 36. As a result, flow between the standpipe and the surrounding chamber is blocked.

Filter element 24 includes a first imperforate end cap 60 at its upper end, and a second imperforate end cap 62 at its lower end. The end caps 60 and 62 are attached in fluid tight relation to the ring of filter media 26 in a conventional manner using potting compound or similar adhesive material. The filter element further includes a perforated tube 64 at the inner surface of the media. The perforated tube provides support for the media and aids in preventing collapse due to pressure forces. The perforated tube 64 bounds an area 66 inside the element adjacent to the standpipe.

Lower end cap 62 includes a central opening (not separately shown) which accepts standpipe 22 therein. A seal 68 extends across the opening to the outer surface of the standpipe to seal area 66 against infiltration of contaminates. An enlarged area 70 of the standpipe serves to hold a disc-shaped heater plate 72 in position between the standpipe and a nipple portion 74 of the housing. Heater plate 72 is adapted for mounting electronic heating elements such as PTC heaters thereon. Such heaters are useful for heating fuel in cold temperatures, particularly diesel fuel. The housing also includes a temperature sensor 73 for sensing the temperature of fuel that is passing to the outlet port. Sensor 73 enables the use of electrical control systems known in the prior art for controlling the heating elements.

Upper end cap 60 has a major cap portion including a centrally positioned cylindrical well area 76. A first projection 78 extends longitudinally inward from the bottom of the well area. As shown in FIG. 1, first projection 78 is adapted for extending through actuator opening 38 to engage flow element 42. In FIG. 1, the first projection is smaller in transverse cross-section than the opening in the lower end cap 62 from which the annular seal 68 radially inwardly projects, and is longer than it is wide, such that the first projection can fit within the actuator opening 38 in the end of the standpipe 22 for actuating the flow element 42.

A first recess 80 is positioned in overlying relation on the upper surface of the end cap above projection 78. A cover projection 82 is positioned centrally on an interior cover top wall 84 of cover 28 (see FIG. 2). Cover projection 82 is adapted to be accepted into recess 80 and serves as support means for supporting projection 78. While cover projection 82 is adapted for adding strength to projection 78, it is of insufficient length to engage flow element 42.

Cover 28 also includes a circular centering wall 86 which extends in surrounding relation to cover projection 82. Centering wall 86 is sized to be accepted into the well area 76 on first end cap 60.

Figure 2:
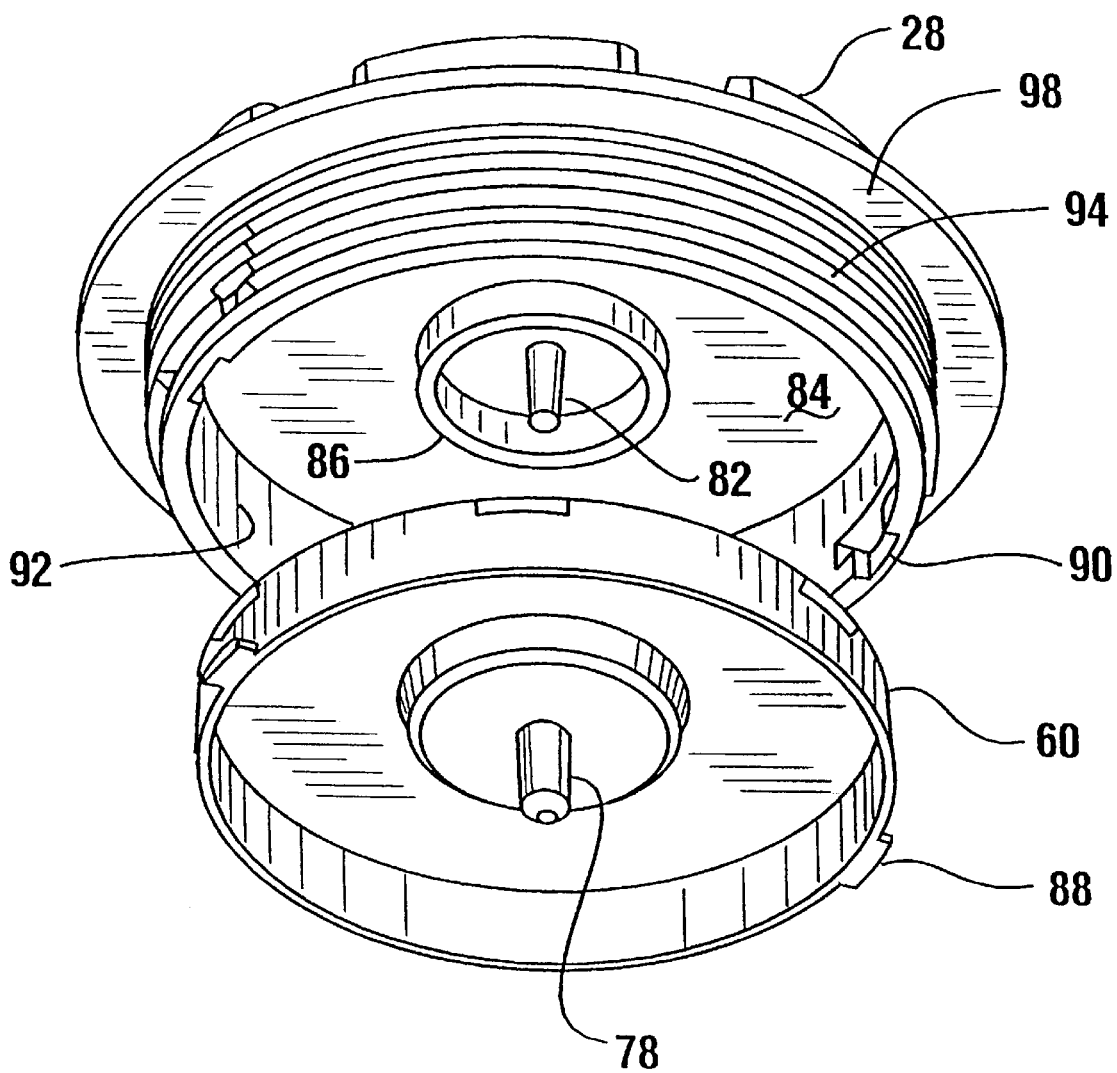
FIG. 2 is an isometric view of the cover of the assembly and an upper end cap of the filter element shown in FIG. 1.

First end cap 60 further includes a pair of laterally extending projections 88. Projections 88 are adapted for engaging T-shaped recesses 90 in a longitudinally extending cover wall 92 of cover 28. As shown in FIG. 2, recesses 90 have both a longitudinally extending portion and an arcuately extending portion. The arcuately extending portion extends in both angular directions from the longitudinally extending portion. As a result, projections 88 and recesses 90 are enabled to serve as latching means for latching the filter element 24 by its end cap 60 to cover 28.

Cover 28 further includes an outwardly threaded portion 94 which is adapted for engaging inwardly threaded portion 96 adjacent the opening to chamber 18. Cover 28 further includes a radially extending flanged portion 98 which is adapted for engaging a lip portion 100 of the housing. Lip portion 100 includes a circumferentially extending recess 102 for housing a resilient seal 104. Seal 104 holds the cover and the housing in fluid tight relation when the cover is installed thereon. Cover 28 also includes outward extending wing projections 106 which facilitate manually holding and turning the cover.

Although not shown in FIG. 1, the fuel filter assembly of the present invention also includes a drain valve of conventional construction which is adapted for enabling the removal of contaminants that collect in a lower portion of chamber 18. Such drain valves, which are well known in the prior art, may be periodically opened to release collected contaminants, which most commonly include water and dirt particles.

In operation, fuel flows into inlet port 14 and enters chamber 18. Fuel then passes through media 26 of the filter element 24 and is cleansed of impurities. The clean fuel travels to area 66 adjacent to the standpipe and passes through openings 36. The fuel then passes through the flow cavities 54 of the flow element 42, through the flow passage 30 of the standpipe and leaves the housing through outlet port 16.

An element change is accomplished by turning cover 28 in a counter-clockwise direction so that threaded portions 94 and 96 of the cover and housing respectively, cause filter element 24 to move upward. As the end cap 60 of filter element 24 moves upward with the cover, first projection 78 retracts out of actuator opening 38. This enables flow element 42 to move upward, so that its cylindrical lower portion 44 is in blocking relation with openings 36. Further outward movement of flow element 42 is prevented by its engagement with guide ring 40.

The turning of cover 28 also causes projections 88 to enter the arcuately extending portions of recesses 102 and engage the wall bounding the recesses due to the frictional force of seal 68 acting on the standpipe. With the projections 88 moved into the arcuate extending portions of recesses 90, the element 24 and the cover 28 are temporarily latched together. The cover 28 is turned until the threaded portion of the cover is disengaged from the housing and the element is removed from chamber 18 by moving the cover upward.

Removing the element with the cover, avoids skin contact with the fuel. Also, as dirt falls off the outside surface of the element, it does not fall into openings 36 because they are closed by element 42 and because the openings extend radially through the standpipe.

The cover 28 and the element 24 are unlatched once the element has been removed from the housing by relative movement of the element in the counter-clockwise direction. Such movement enables projections 88 on the element to pass out of the arcuately extending portions of the recesses 90 and into the longitudinally extending portions. Once the projections 88 are in the longitudinally extending portions of the recesses 90, the cover and element may be readily separated.

A new filter element is latched to the cover 28 by insertion of the projections 88 on the end cap 60 into the longitudinally extending portions of the recesses 90. Thereafter the element is moved inward in the recesses until the projections 88 are aligned with the arcuately extending portions of the recesses. Twisting the element in a rotational direction, preferably clockwise, engages the projections 88 in the arcuately extending portions of the recesses.

The element is then installed in chamber 18 by inserting standpipe 22 into the opening in the lower end cap 62. The element is then moved downward. As this is done, seal 68 on the lower end cap wipes away impurities from the standpipe and keeps dirty fuel away from area 66 inside the element.

Further movement of element 24 into the chamber causes first projection 78 to enter actuator opening 38. Projection 78 engages and moves flow element 42 downward to again open openings 36 as shown in FIG. 1. Because projection 78 is reinforced by cover projection 82, it has sufficient strength to move the flow element against the biasing force of spring 58 even though the end cap 60 is of relatively flexible material, which by itself would not have sufficient strength.

The cover 28 is then threadibly engaged with the housing until the flange portion 98 on the cover abuts lip portion 100 of the housing. In this position, seal 104 maintains the cover and housing in fluid tight relation.

An alternative cover and element assembly is shown in FIGS. 5–8. The alternative cover and element is suitable for use with housing 12 but includes alternative latching means for latching the element and cover in engaged relation.

Figure 5:
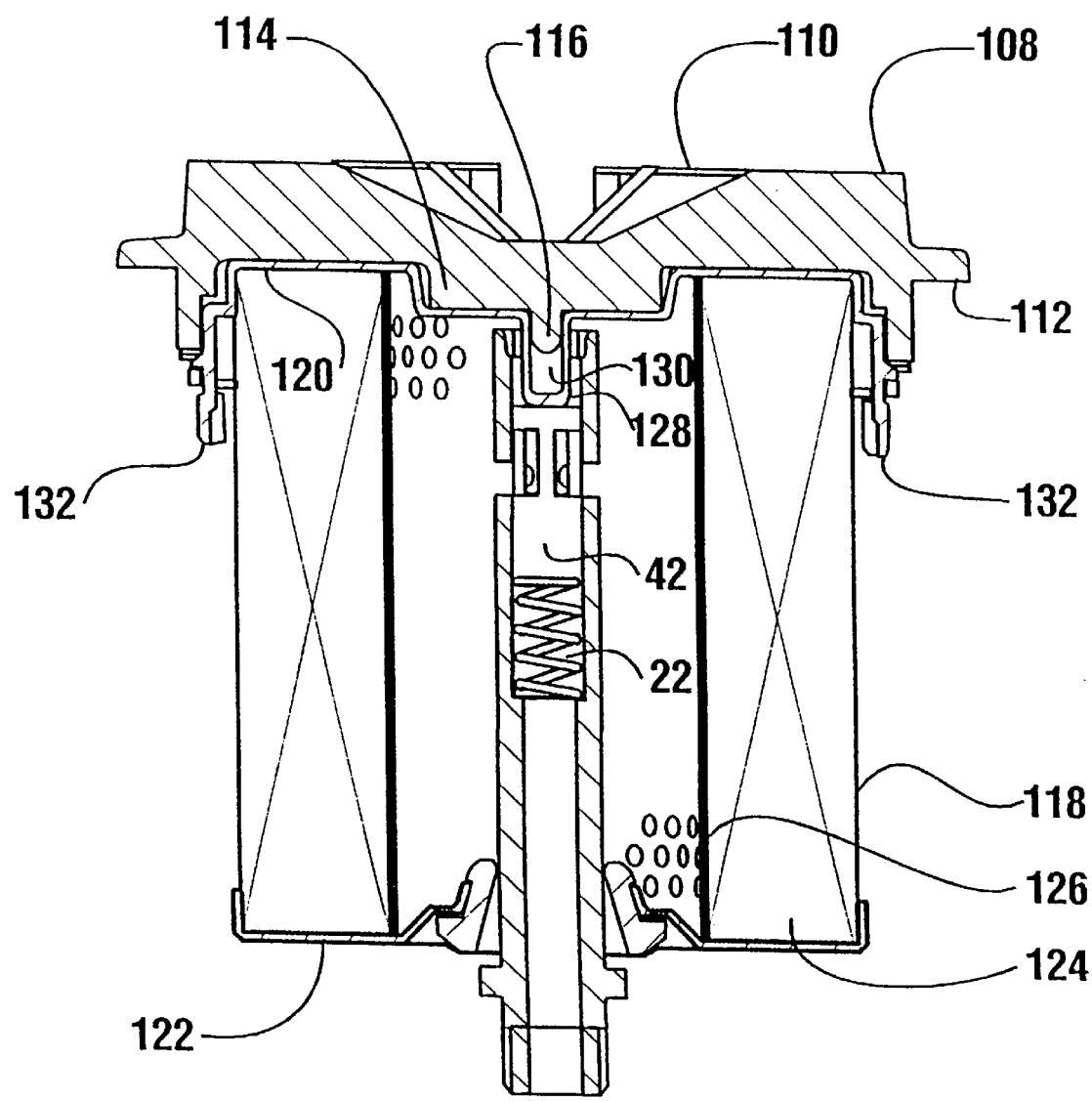
FIG. 5 is a cross sectional view of an alternative embodiment of a filter element and cover assembly.

As shown in FIG. 5 an alternative cover 108 includes manually engageable wing projections 110 on an upper surface thereof. Cover 108 includes a flange portion 112 for engaging lip portion 100 of the housing. Cover 108 includes a downward centering projection 114 from which a cover projection 116 extends.

An alternative element 118 includes a first end cap 120 and a second end cap 122. Media 124 supported on a perforated tube 126 extends between the end caps in the manner of the previously described embodiment. Second end cap 122 includes an opening and seal for accepting standpipe 22 in the same manner as second end cap 62.

First end cap 120 includes a projection 128 and an overlying access 130. Recess 130 accepts cover projection 116 therein and projection 128 engages flow element 42 is a manner similar to previously described embodiment.

Figure 6:
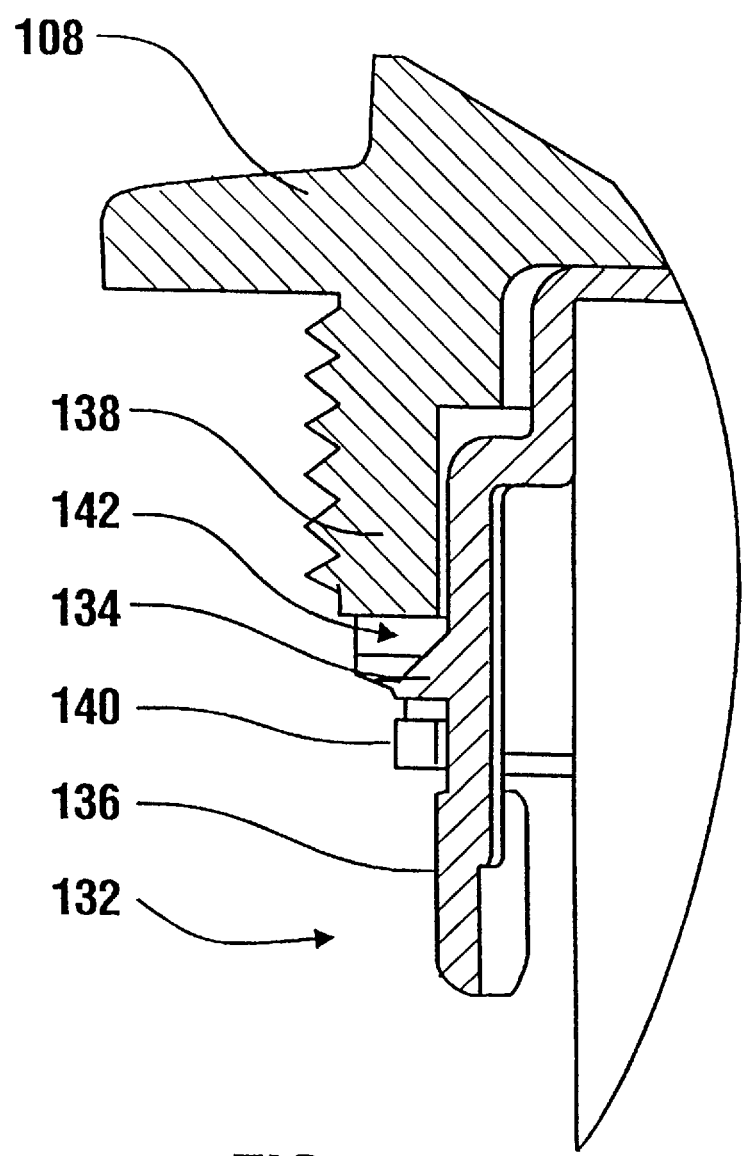
FIG. 6 is an enlarged view of the latching portions of the filter element and cover shown in FIG. 5.
Figure 7:
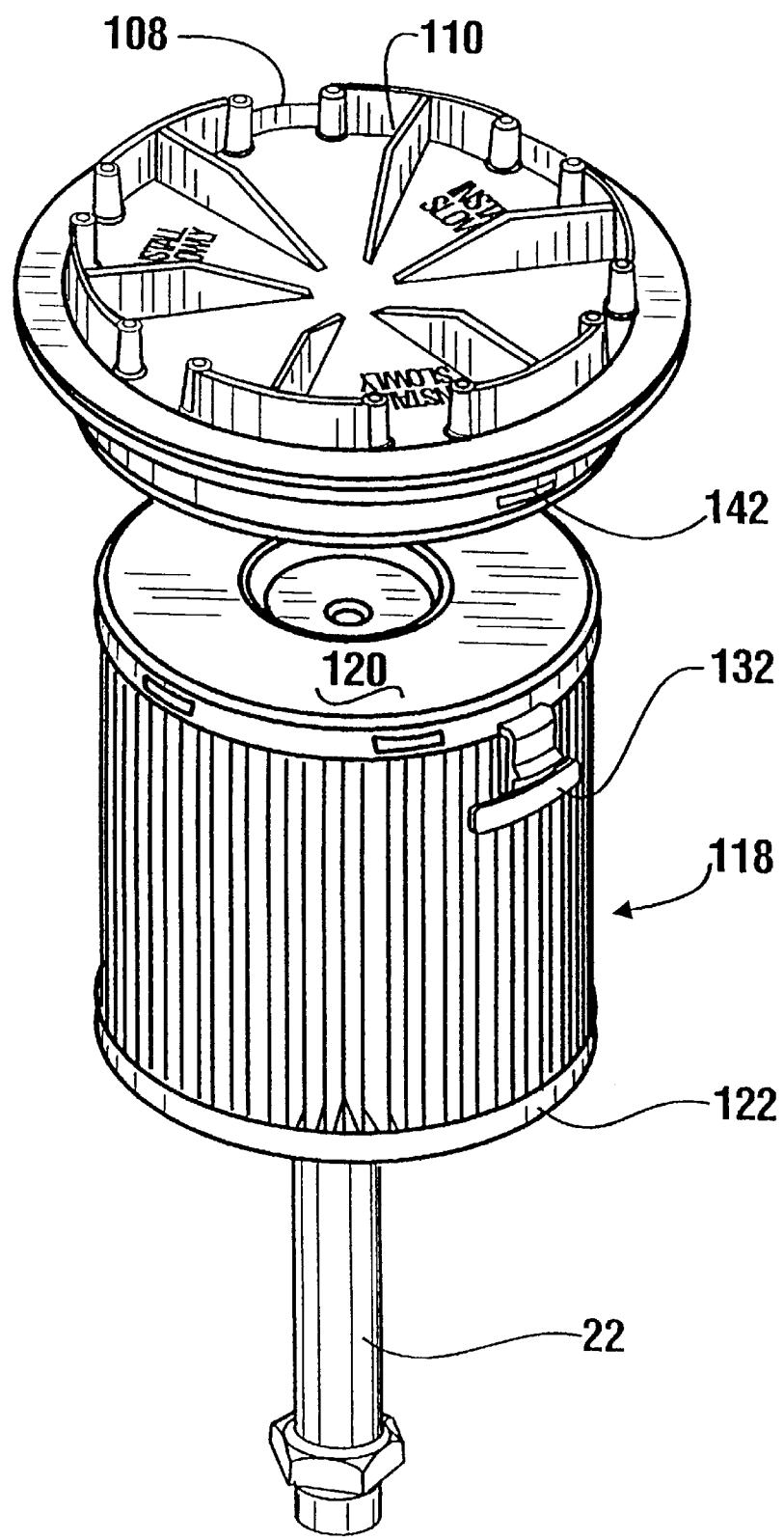
FIG. 7 is an exploded isometric view of the filter element and cover shown in FIG. 5.
Figure 8:
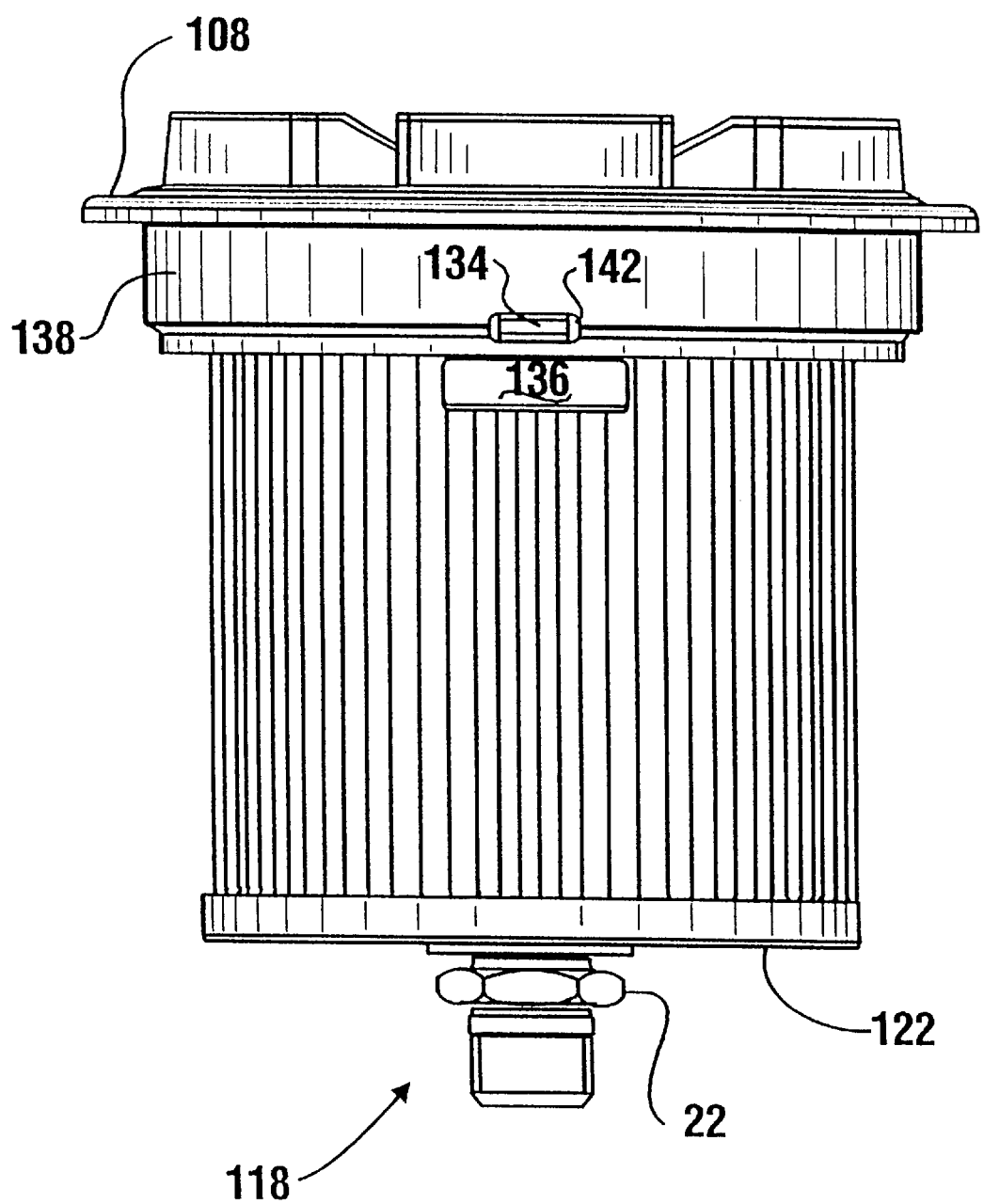
FIG. 8 is a right side view of the filter element and cover assembly shown in FIG. 5.

First end cap 120 includes a pair of oppositely spaced latching fingers 132. As best shown in FIGS. 6 and 7, latching fingers 132 extend axially and are disposed from the outer surface of the filter media. Fingers 132 include a tapered outward extending locking portions 134 and arcuately extending, manually engageable flats 136.

Cover 108 includes a downward extending circular wall 138 which bounds an interior recess into which first end cap 120 and the adjacent area of element 108 is accepted. The outer surface of wall 138 is threaded and engages the threaded portion 96 of housing 12.

Wall 138 includes in cross section a tapered end portion 140. Tapered end portion 140 includes a pair of openings 142 therethrough. Openings 142 are sized for accepting the locking portions 134 of latching fingers 132 therein.

The latching fingers 132 and openings 142 provide for engagement of cover 108 and element 118. To engage the element and cover, upper end cap is pushed into the recess bounded by wall 138 with the openings 142 aligned with locking portions 134. As the element is pressed into the recess, the fingers are deformed inward until the locking portions snap into place in the openings. The cover may then be used to install the element in the housing in the same manner as the previously described embodiment.

Removal of the element from the housing is accomplished by rotating cover 108 to disengage the threads of the cover and the housing. The element is removed from the housing with the cover. The cover and element are disengaged by pressing radially inward on the flats 136 of fingers 132. This deforms the fingers and causes the locking portions to move to disengage openings 142. This enables the cover to be separated from the element, and the spent element can be held by the fingers until it is deposited in a receptacle for disposal. A new element is then snapped onto the cover.

The solid engagement of the cover and element achieved by the latching fingers avoids accidental disengagement of the cover and element during installation and removal of the element from the housing. However, the latching fingers also enable ready disengagement of the element and cover without the need to contact the fuel.

The preferred embodiments of the present invention enable use of the cover to remove and install the element even though it is not a permanent part thereof. This reduces the amount of material that must be discarded with a spent element. Further, because the cover provides support for the first end cap of the element, the upper end cap may be made of relatively thin flexible material which further reduces waste and cost.

A further advantage of the invention is that the assembly cannot be readily operated without the element present.

This is because the cover projection is not long enough to engage the flow element. The construction of the present invention further avoids confusion because the element can only be installed one way, and the means for latching the cover and element together are easy to use.

Other embodiments of the fuel filter assembly with a removal element of the present invention, may be used with filters that have inside-out flow configurations. This may be advantageous particularly when the inlet port of the housing is under pressure. In such applications, the flow element may be used to prevent the introduction of additional fuel into the chamber during removal of the element which minimizes spillage.

Thus, the fuel filter assembly with replaceable element of the present invention achieves the above-stated objectives, eliminates difficulties encountered in the use of prior devices, solves problems, and attains the desirable results described herein.

In the foregoing description certain terms have been used for brevity, clarity, and understanding. However, no unnecessary limitations are to be implied therefrom because such terms are for descriptive purposes and are intended to be broadly construed. Moreover, the descriptions and illustrations are by way of examples and the invention is not limited to the details shown and described.

Having described the features, discoveries and principles of the invention, the manner in which it is constructed and operated, and the advantages and useful results attained; the new and useful structures, devices, elements, arrangements, parts, combinations, systems, equipment, operations and relationships are set forth in the appended claims.

We claim:

1. A replaceable filter element removably positionable within a housing composed of mating parts forming an interior enclosure for the filter element, said filter element comprising:

a first imperforate end cap, said first end cap having a major cap portion, a first longitudinally extending projection extending longitudinally from said major cap portion, and attachment structure directly fixedly joining said first longitudinally extending projection to said major cap portion independently of the mating part of the housing that would be adjacent to said first imperforate end cap;

a continuous ring of filter media, said ring having an interior surface bounding an interior area, said ring being adhesively bonded in fluid tight relation to said major cap portion of said first end cap, and said interior area being closed at an end thereof by said first end cap;

a second end cap longitudinally disposed from said first end cap and attached in fluid tight relation to said media ring, said second end cap having a standpipe opening therethrough axially aligned with said first longitudinally extending projection and through which a standpipe can be inserted longitudinally into said interior area;

wherein said first longitudinally extending projection extends in said interior area and is radially disposed inwardly from said interior surface, is smaller in transverse cross-section than said opening in said second end cap and is longer than it is wide, such that said first longitudinally extending projection can fit within an actuator opening in the end of the standpipe when inserted longitudinally through said opening in the second end cap for actuating a valve flow element mounted to the standpipe; and said major cap portion including an annular portion to which the filter media ring is bonded and a well area radially inwardly of said annular portion, said well area extending longitudinally into said interior area and including a radially extending bottom wall and an annular side wall extending between said bottom wall and annular portion, said bottom wall having a planar extent extending substantially perpendicularly to a longitudinal axis of said filter element, said longitudinally extending projection having a base end supported by said bottom wall radially inwardly of said annular wall, said longitudinally extending projection including a tubular wall forming a portion of a recess that opens away from said interior area to an axially outer side of said bottom wall, and said longitudinally extending projection terminating at a point closer to said first end cap than said second end cap.

2. The filter element according to claim 1, wherein said first end cap includes a deformable latching finger extending longitudinally and radially disposed outwardly from said media ring for interconnecting with connecting structure on another member.

3. The filter element according to claim 2, and further comprising a radially outward extending projection on said latching finger intermediate of said first end cap and an opposed end of said finger.

4. The filter element according to claim 1, wherein a resilient seal circumferentially bounds said opening in said second end cap for sealing to the standpipe.

5. A filter assembly comprising a filter element and a cover, said filter element comprising:

a first imperforate end cap, said first end cap having a major cap portion and a first longitudinally extending projection extending longitudinally from said major cap portion;

a continuous ring of filter media, said ring having an interior surface bounding an interior area, said ring being bonded in fluid tight relation to said first end cap, and said interior area being closed at an end thereof by said first end cap;

a second end cap longitudinally disposed from said first end cap and attached in fluid tight relation to said media ring, said second end cap having a standpipe opening therethrough axially aligned with said first longitudinally extending projection and through which a standpipe can be inserted longitudinally into said interior area;

wherein said first longitudinally extending projection extends in said interior area and is radially disposed inwardly from said interior surface, is smaller in transverse cross-section than said opening in said second end cap and is longer than it is wide, such that said first longitudinally extending projection can fit within an actuator opening in the end of the standpipe when inserted longitudinally through said opening in the second end cap for actuating a valve flow element mounted to the standpipe; and said major cap portion including an annular portion to which the filter media ring is bonded and a well area radially inwardly of said annular portion, said well area extending longitudinally into said interior area and including a radially extending bottom wall and an annular side wall extending between said bottom wall and annular portion, said bottom wall having a planar extent extending substantially perpendicularly to a longitudinal axis of said filter element, said longitudinally extending projection having a base end supported by said bottom wall radially inwardly of said annular wall, said longitudinally extending projection including a tubular wall forming a portion of a recess that opens away from said interior area to an axially outer side of said bottom wall, and said longitudinally extending projection terminating at a point closer to said first end cap than said second end cap; and said cover including a cover projection abuttingly engaged in said recess of said first end cap.

6. The filter assembly according to claim 5, wherein said first end cap includes a deformable latching finger extending longitudinally and disposed radially outward from said media ring, said latching finger releasably engageable with connecting structure on said cover.

7. The filter assembly according to claim 6, wherein said first end cap comprises a pair of diametrically opposed latching fingers releasably engageable with said cover.

8. The filter assembly according to claim 7, wherein said latching fingers include radially outward extending projections engageable in respective openings in said cover.

9. The filter assembly according to claim 8, wherein each of said latching fingers further comprises flats at an end opposed of said first end cap.

10. A filter assembly comprising a replaceable filter element and a standpipe, said filter element removably positionable within a housing composed of mating parts forming an interior enclosure for the filter element, said filter element comprising:

a first imperforate end cap, said first end cap having a major cap portion, a first longitudinally extending projection extending longitudinally from said major cap portion, and attachment structure directly fixedly joining said first longitudinally extending projection to said major cap portion independently of the mating part of the housing that would be adjacent to said first imperforate end cap;

a continuous ring of filter media, said ring having an interior surface bounding an interior area, said ring being adhesively bonded in fluid tight relation to said major cap portion of said first end cap, and said interior area being closed at an end thereof by said first end cap;

a second end cap longitudinally disposed from said first end cap and attached in fluid tight relation to said media ring, said second end cap having a standpipe opening therethrough axially aligned with said first longitudinally extending projection and through which a standpipe can be inserted longitudinally into said interior area;

wherein said first longitudinally extending projection extends in said interior area and is radially disposed inwardly from said interior surface, is smaller in transverse cross-section than said opening in said second end cap and is longer than it is wide, such that said first longitudinally extending projection can fit within an actuator opening in the end of said standpipe when inserted longitudinally through said opening in the second end cap for actuating a valve flow element mounted to said standpipe; and said standpipe extending longitudinally in said interior area and having an actuator opening in a first longitudinal end of said standpipe, said first longitudinally extending projection accepted in said actuator opening, and a valve flow element mounted on said standpipe, said valve flow element in engagement with said first projection, whereby said valve flow element is held in an open condition.

11. The filter assembly according to claim 10, wherein said standpipe has an outer cylindrical surface of generally constant diameter through said interior area, and said standpipe extending through said opening in said second end cap is in fluid tight relation with said second end cap.

12. The filter element according to claim 4, wherein said first end cap includes a deformable latching finger extending longitudinally toward said second end cap and radially disposed outward from said media ring for interconnecting with connecting structure on another member.

13. The filter element according to claim 12, and further comprising a well area in said first end cap on a side opposed of said media ring, wherein said well area is cylindrical and coaxial with said first longitudinally extending projection.

14. The filter element according to claim 12, wherein said first end cap includes a recess on a side of said first end cap opposed of said media ring, said recess coaxial with said first projection.

15. A replaceable filter element removably positionable within a housing composed of mating parts forming an interior enclosure for the filter element, said filter element comprising:

a ring of filter media having a longitudinal axis, said filter media ring having an interior surface bounding an interior area; and first and second end caps respectively adhesively bonded in fluid tight relation to opposite ends of said filter media ring;

said first end cap closing one end of said interior area bounded by said filter media ring and having a major cap portion at which said first end cap is adhesively bonded in fluid tight relation to said filter media ring, a longitudinally extending projection extending longitudinally from said major cap portion, and attachment structure directly fixedly joining said longitudinally extending projection to said major cap portion independently of the mating part of the housing that would be adjacent to said first end cap;

said second end cap having an opening therethrough axially aligned with said projection and through which an external member can be inserted longitudinally into said interior area;

said longitudinally extending projection (i) extending in said interior area of said filter media ring parallel to said longitudinal axis, (ii) being disposed radially inwardly from said interior surface of said filter media ring, (iii) being smaller in transverse cross-section than said opening in said second end cap and (iv) being longer than it is wide, such that said longitudinally extending projection can fit within an actuator opening in the end of the external member when inserted longitudinally through said opening in the second end cap for actuating a valve flow element mounted to the external member; and said major cap portion including an annular portion to which the filter media ring is bonded and a well area radially inwardly of said annular portion, said well area extending longitudinally into said interior area and including a radially extending bottom wall and an annular side wall extending between said bottom wall and annular portion, said bottom wall having a planar extent extending substantially perpendicularly to a longitudinal axis of said filter element, said longitudinally extending projection having a base end supported by said bottom wall radially inwardly of said annular wall, said longitudinally extending projection including a tubular wall forming a portion of a recess that opens away from said interior area to an axially outer side of said bottom wall, and said longitudinally extending projection terminating at a point closer to said first end cap than said second end cap.

16. The filter element according to claim 15, comprising an annular seal inwardly bounding said opening in said second end cap.

17. The filter element according to claim 15, comprising an annular seal protruding radially inwardly of said opening in said second end cap, and said longitudinally extending projection being smaller in transverse cross-section than an opening bounded by said annular seal.

18. The filter element according to claim 15, wherein said bottom wall is in the form of a flat planar disc.

19. The filter element according to claim 15, wherein said well area is formed as a single unitary piece with said annular portion.

20. The filter element according to claim 15, wherein said longitudinally extending projection includes a tubular wall closed at one end.

21. The filter element according to claim 15, wherein said longitudinally extending projection is centrally located relative to said opening.

22. The filter element according to claim 15, wherein said longitudinally extending projection is formed as a single unitary piece with said well area and annular portion of said first end cap.

23. A filter assembly comprising a replaceable filter element and an external member, said filter element removably positionable within a housing composed of mating parts forming an interior enclosure for the filter element, said filter element comprising:

a ring of filter media having longitudinal axis, said filter media ring having an interior surface bounding an interior area; and first and second end caps respectively adhesively bonded in fluid tight relation to opposite ends of said filter media ring;

said first end cap closing one end of said interior area bounded by said filter media ring and having a major cap portion at which said first end cap is adhesively bonded in fluid tight relation to said filter media ring, a longitudinally extending projection extending longitudinally from said major cap portion, and attachment structure directly fixedly joining said longitudinally extending projection to said major cap portion independently of the mating part of the housing that would be adjacent to said first end cap;

said second end cap having an opening therethrough axially aligned with said projection and through which said external member can be inserted longitudinally into said interior area;

said longitudinally extending projection (i) extending in said interior area of said filter media ring parallel to said longitudinal axis, (ii) being disposed radially inwardly from said interior surface of said filter media ring, (iii) being smaller in transverse cross-section than said opening in said second end cap and (iv) being longer than it is wide, such that said longitudinally extending projection can fit within an actuator opening in the end of said external member when inserted longitudinally through said opening in the second end cap for actuating a valve flow element mounted to the external member; and said external member extendable longitudinally into said interior area and including a flow passage and a valve flow element mounted in said external member for movement from a normally closed position to an open use position, and said valve flow element being engaged and moved by said longitudinally extending projection from said normally closed position to said open use position when said external member is inserted into said interior area.

24. A replaceable filter element removably positionable within a housing composed of mating parts forming an interior chamber for the filter element, said filter element comprising:

a ring of filter media having a longitudinal axis, said filter media ring having an interior surface bounding an interior area; and first and second end caps respectively adhesively bonded in fluid tight relation to opposite ends of said filter media ring, said first end cap closing one end of said interior area bounded by said filter media; said second end cap having an opening therethrough and through which an external member can be inserted longitudinally into said interior area; and there being provided a longitudinally extending projection unitary with an annular portion of the first end cap which is adhesively bonded to the filter media ring, said longitudinally extending projection being axially aligned with said opening and extending in said interior area of said filter media ring parallel to said longitudinal axis, said longitudinally extending projection being disposed radially, inwardly from said interior surface of said filter media ring, being smaller in transverse cross-section than said opening in said second end cap and being longer than it is wide, such that said longitudinally extending projection can fit within an actuator opening in the end of the external member when inserted longitudinally through said opening in the second end cap for actuating a valve flow element mounted to the external member; and said major cap portion including a well area, said well area extending longitudinally into said interior area and including a radially extending bottom wall and an annular side wall, said bottom wall having a planar extent extending substantially perpendicular to said longitudinal axis, said longitudinally extending projection having a base end supported by said bottom wall radially inwardly of said annular wall, said longitudinally extending projection including a tubular wall forming a portion of a recess that opens away from said interior area to an axially outer side of said bottom wall, said longitudinally extending projection terminating at a point closer to said first end cap than said second end cap, and said tubular wall of said longitudinally extending projection having parallel wall surfaces extending longitudinally.

25. The filter element according to claim 24, comprising an annular seal inwardly bounding said opening in said second end cap.

26. The filter element according to claim 24, comprising an annular seal protruding radially inwardly of said opening in said second end cap, and said longitudinally extending projection being smaller in transverse cross-section than an opening bounded by said annular seal.

27. The filter element according to claim 24, wherein said longitudinally extending projection includes a tubular wall closed at one end.

28. The filter element according to claim 24, wherein said longitudinally extending projection is centrally located relative to said opening.

29. A filter assembly comprising a replaceable filter element and an external member, said filter element removably positionable within a housing composed of mating parts forming an interior chamber for the filter element, said filter element comprising:

a ring of filter media having a longitudinal axis, said filter media ring having an interior surface bounding an interior area; and first and second end caps respectively adhesively bonded in fluid tight relation to opposite ends of said filter media ring, said first end cap closing one end of said interior area bounded by said filter media: said second end cap having an opening therethrough and through which an external member can be inserted longitudinally into said interior area; and there being provided a longitudinally extending projection unitary with an annular portion of the first end cap which is adhesively bonded to the filter media ring, said longitudinally extending projection being axially aligned with said opening and extending in said interior area of said filter media ring parallel to said longitudinal axis, said longitudinally extending projection being disposed radially inwardly from said interior surface of said filter media ring, being smaller in transverse cross-section than said opening in said second end cap and being longer than it is wide, such that said longitudinally extending projection can fit within an actuator opening in the end of the external member when inserted longitudinally through said opening in the second end cap for actuating a valve flow element mounted to the external member; and said external member extendable longitudinally into said interior area and including a flow passage and a valve flow element mounted in said external member for movement from a normally closed position to an open use position, and said valve flow element being engaged and moved by said longitudinally extending projection from said normally closed position to said open use position when said external member is inserted into said interior area.

30. A replaceable filter element removably positionable within a housing composed of mating parts forming an interior chamber for the filter element, said filter element comprising:

a ring of filter media having a longitudinal axis, said filter media ring having an interior surface bounding an interior area; and first and second end caps respectively adhesively bonded in fluid tight relation to opposite ends of said filter media ring, said second end cap having an opening therethrough and through which an end of an external member can be inserted longitudinally into said interior area; and there being provided:

a longitudinally extending projection unitary with an annular portion of the first end cap which is adhesively bonded to the filter media ring, said longitudinally extending projection extending longitudinally in said interior area of said filter media ring and disposed radially inwardly from said interior surface of said filter media ring, said longitudinally extending projection having an end portion located in said interior area radially inwardly of an imaginary longitudinal projection of said opening, whereby said longitudinally extending projection can engage and actuate a valve flow element associated with the end of the external member, and said longitudinally extending projection terminating at a point closer to said first end cap than said second end cap; and an annular seal radially inwardly bounding said opening in said second end cap, said annular seal being fixed to and thereby carried by said second end cap, and said annular seal protruding radially inwardly of said opening for sealing to the external member when inserted into said interior area.

31. The filter element according to claim 30, wherein said longitudinally extending projection includes a tubular wall.

32. The filter element according to claim 30, wherein said longitudinally extending projection is centrally located relative to said opening.

33. The filter element according to claim 30, wherein said longitudinally extending projection is formed as a single unitary piece with said first end cap.

34. A filter assembly comprising a replaceable filter element and an external member, said filter element removably positionable within a housing composed of mating parts forming an interior chamber for the filter element, said filter element comprising:
a ring of filter media having a longitudinal axis, said filter media ring having an interior surface bounding an interior area; and first and second end caps respectively adhesively bonded in fluid tight relation to opposite ends of said filter media ring, said second end cap having an opening therethrough and through which an end of an external member can be inserted longitudinally into said interior area; and there being provided:

a longitudinally extending projection unitary with an annular portion of the first end cap which is adhesively bonded to the filter media ring, said longitudinally extending projection extending longitudinally in said interior area of said filter media ring and disposed radially inwardly from said interior surface of said filter media ring, said longitudinally extending projection having an end portion located in said interior area radially inwardly of an imaginary longitudinal projection of said opening whereby said longitudinally extending projection can engage and actuate a valve flow element associated with the end of the external member, and an annular seal radially inwardly bounding said opening in said second end cap, said annular seal being fixed to and thereby carried by said second end cap, and said annular seal protruding radially inwardly of said opening for sealing to the external member when inserted into said interior area; and said external member extendable longitudinally into said interior area and including a flow passage and a valve flow element associated with said external member for movement from a normally closed position to an open use position, and said valve flow element being engaged and moved by said longitudinally extending projection from said normally closed position to said open use position when said external member is inserted into said interior area.

35. A replaceable filter element removably positionable within a housing composed of mating parts forming an interior chamber for the filter element, said filter element comprising:

a continuous ring of filter media, said ring having an interior surface bounding an interior area;

a first imperforate end cap closing an end of said interior area, said first end cap having a major cap portion and a longitudinally extending projection extending longitudinally from said major cap portion and fixedly joined to said major cap portion independently of the mating part of the housing that would be adjacent to said first imperforate end cap, said major cap portion having an annular portion bonded in fluid tight relation to an end of said ring of filter media;

a second end cap longitudinally disposed from said first end cap and attached in fluid tight relation to said media ring, said second end cap having a standpipe opening therethrough axially aligned with said first projection and through which a standpipe can be inserted longitudinally into said interior area;

wherein said longitudinally extending projection extends in said interior area and is radially disposed inwardly from said interior surface, is smaller in transverse cross-section than the opening in said second end cap and is longer than it is wide, such that said longitudinally extending projection can fit within an actuator opening in the end of the standpipe when inserted longitudinally through said opening in the second end cap for actuating a valve flow element mounted to the standpipe; and said major cap portion further having a central portion unitary with said annular portion, said central portion extending radially inwardly from said annular portion so as to radially overlap in axially offset relation the standpipe opening, and said longitudinally extending projection being directly joined to said central portion; and said central portion includes a radially extending wall extending radially inwardly of said interior surface a distance greater than the width of said longitudinally extending projection, said longitudinally extending projection having a base end supported by said radially extending wall radially inwardly of said interior surface of said filter media ring, and said longitudinally extending projection includes a tubular wall forming a portion of a recess that opens to an axially outer side of said radially extending wall.

36. The filter element according to claim 35, wherein said major cap portion, central portion and longitudinally extending projection are formed as one piece.

37. The filter element according to claim 35, wherein said central portion has a well area.

38. The filter element according to claim 37, wherein said well area is open to a side of said first end cap opposite the filter media ring.

39. The filter element according to claim 37, wherein said well area extends axially in said interior area.

40. The filter element according to claim 37, wherein said well area is cylindrical and coaxial with said longitudinally extending projection.

41. The filter element according to claim 40, wherein said tubular wall is closed at an axially inner end.

42. The filter element according to claim 41, wherein said well area is open to a side of said first end cap opposite the filter media ring.

43. The filter element according to claim 37, wherein said well area is disposed axially inwardly of said annular portion.

44. The filter element according to claim 35, wherein said tubular wall is closed at an axially inner end.

45. A replaceable filter element removably positionable within a housing composed of mating parts forming an interior enclosure for the filter element, said filter element comprising:

a first imperforate end cap, said first end cap having a major cap portion, a first longitudinally extending projection extending longitudinally from said major cap portion, and means for directly fixedly joining said longitudinally extending projection to said major cap portion independently of the mating part of the housing that would be adjacent to said first imperforate end cap;

a continuous ring of filter media, said ring having an interior surface bounding an interior area, said ring being adhesively bonded in fluid tight relation to said major cap portion of said first end cap, and said interior area being closed at an end thereof by said first end cap;

a second end cap longitudinally disposed from said first end cap and attached in fluid tight relation to said media ring, said second end cap having a standpipe opening therethrough axially aligned with said longitudinally extending projection and through which a standpipe can be inserted longitudinally into said interior area;

wherein said first longitudinally extending projection extends in said interior area and is radially disposed inwardly from said interior surface, is smaller in transverse cross-section than said opening in the second end cap and is longer than it is wide, such that said longitudinally extending projection can fit within an actuator opening in the end of the standpipe when inserted longitudinally through said opening in said second end cap for actuating a valve flow element mounted to the standpipe; and said major cap portion including an annular portion to which the filter media ring is bonded and a well area radially inwardly of said annular portion, said well area extending longitudinally into said interior area and including a radially extending bottom wall and an annular side wall extending between said bottom wall and annular portion, said bottom wall having a planar extent extending substantially perpendicularly to a longitudinal axis of said filter element, said longitudinally extending projection having a base end supported by said bottom wall radially inwardly of said annular wall, said longitudinally extending projection including a tubular wall forming a portion of a recess that opens away from said interior area to an axially outer side of said bottom wall, and said longitudinally extending projection terminating at a point closer to said first end cap than said second end cap.

46. A replaceable filter element removably positionable within a housing composed of mating parts forming an interior enclosure for the filter element, said filter element comprising:

a ring of filter media having a longitudinal axis, said filter media ring having an interior surface bounding an interior area; and first and second end caps respectively adhesively bonded in fluid tight relation to opposite ends of said filter media ring;

said first end cap closing one end of said interior area bounded by said filter media ring and having a major cap portion at which said first end cap is adhesively bonded in fluid tight relation to said filter media ring, a longitudinally extending projection extending longitudinally from said major cap portion, and means for directly fixedly joining said longitudinally extending projection to said major cap portion independently of the mating part of the housing that would be adjacent to said first end cap;

said second end cap having an opening therethrough axially aligned with said projection and through which an external member can be inserted longitudinally into said interior area;

said longitudinally extending projection (i) extending in said interior area of said filter media ring parallel to said longitudinal axis, (ii) being disposed radially inwardly from said interior surface of said filter media ring, (iii) being smaller in transverse cross-section than said opening in said second end cap and (iv) being longer than it is wide, such that said longitudinally extending projection can fit within an actuator opening in the end of the external member when inserted longitudinally through said opening in the second end cap for actuating a valve flow element mounted to the external member; and said major cap portion including an annular portion to which the filter media ring is bonded and a well area radially inwardly of said annular portion, said well area extending longitudinally into said interior area and including a radially extending bottom wall and an annular side wall extending between said bottom wall and annular portion, said bottom wall having a planar extent extending substantially perpendicularly to a longitudinal axis of said filter element, said longitudinally extending projection having a base end supported by said bottom wall radially inwardly of said annular wall, said longitudinally extending projection including a tubular wall forming a portion of a recess that opens away from said interior area to an axially outer side of said bottom wall, and said longitudinally extending projection terminating at a point closer to said first end cap than said second end cap.

47. The filter element according to claim 46, comprising an annular seal inwardly bounding said opening in said second end cap.

48. The filter element according to claim 46, comprising an annular seal protruding radially inwardly of said opening in said second end cap, and said longitudinally extending projection being smaller in transverse cross-section than an opening bounded by said annular seal.

49. The filter element according to claim 46, wherein said said longitudinally extending projection terminates at a point closer to said first end cap than said second end cap.

50. The filter element according to claim 49, wherein well area is formed as a single unitary piece with said annular portion.

51. The filter element according to claim 46, wherein said longitudinally extending projection includes a tubular wall closed at one end.

52. The filter element according to claim 46, wherein said longitudinally extending projection is centrally located relative to said opening.

53. The filter element according to claim 46, wherein said longitudinally extending projection is formed as a single unitary piece with said well area and annular portion of said first end cap.

54. A filter assembly comprising a replaceable filter element and an external member, said filter element removably positionable within a housing composed of mating parts forming an interior enclosure for the filter element, said filter element comprising:
a ring of filter media having a longitudinal axis, said filter media ring having an interior surface bounding an interior area; and first and second end caps respectively adhesively bonded in fluid tight relation to opposite ends of said filter media ring;

said first end cap closing one end of said interior area bounded by said filter media ring and having a major cap portion at which said first end cap is adhesively bonded in fluid tight relation to said filter media ring, a longitudinally extending projection extending longitudinally from said major cap portion, and means for directly fixedly joining said longitudinally extending projection to said major cap portion independently of the mating part of the housing that would be adjacent to said first end cap;

said second end cap having an opening therethrough axially aligned with said projection and through which an external member can be inserted longitudinally into said interior area;

said longitudinally extending projection (i) extending in said interior area of said filter media ring parallel to said longitudinal axis, (ii) being disposed radially inwardly from said interior surface of said filter media ring, (iii) being smaller in transverse cross-section than said opening in said second end cap and (iv) being longer than it is wide, such that said longitudinally extending projection can fit within an actuator opening in the end of the external member when inserted longitudinally through said opening in the second end cap for actuating a valve flow element mounted to the external member; and said external member extendable longitudinally into said interior area and including a flow passage and a valve flow element mounted in said external member for movement from a normally closed position to an open use position, and said valve flow element being engaged and moved by said longitudinally extending projection from said normally closed position to said open use position when said external member is inserted into said interior area.

55. A replaceable filter element removably positionable within a housing composed of mating parts forming an interior chamber for the filter element, said filter element comprising:

a ring of filter media having a longitudinal axis, said filter media ring having an interior surface bounding an interior area; and first and second end caps respectively adhesively bonded in fluid tight relation to opposite ends of said filter media ring, said second end cap having an opening therethrough and through which an end of an external member can be inserted longitudinally into said interior area, and said first end cap having an annular portion to which the ring of filter media is adhesively bonded; and there being provided:

a longitudinally extending projection extending longitudinally in said interior area of said filter media ring and disposed radially inwardly from said interior surface of said filter media ring, said longitudinally extending projection having an end portion located in said interior area radially inwardly of an imaginary longitudinal projection of said opening, whereby said longitudinally extending projection can engage and actuate a valve flow element associated with the end of the external member, and said longitudinally extending projection being directly fixedly joined to said annular portion by attachment structure independently of the mating part of the housing that would be adjacent to said first end cap; and an annular seal radially inwardly bounding said opening in said second end cap, said annular seal being fixed to and thereby carried by said second end cap, and said annular seal protruding radially inwardly of said opening for sealing to the external member when inserted into said interior area; and said longitudinally extending projection terminating at a point closer to said first end cap than said second end cap.

\* \* \* \* \*